United States Patent
Farahani et al.

(10) Patent No.: US 10,651,633 B2
(45) Date of Patent: May 12, 2020

(54) MODULAR, SPACE-EFFICIENT STRUCTURES MOUNTING MULTIPLE ELECTRICAL DEVICES

(71) Applicant: Smart Wires Inc., San Francisco, CA (US)

(72) Inventors: Ali Farahani, Orange, CA (US); Haroon Inam, San Jose, CA (US)

(73) Assignee: Smart Wires Inc., Union City, CA (US)

( * ) Notice: Subject to any disclaimer, the term of this patent is extended or adjusted under 35 U.S.C. 154(b) by 0 days.

(21) Appl. No.: 15/473,354

(22) Filed: Mar. 29, 2017

(65) Prior Publication Data
US 2017/0310089 A1  Oct. 26, 2017

Related U.S. Application Data

(60) Provisional application No. 62/326,240, filed on Apr. 22, 2016.

(51) Int. Cl.
*H02B 1/04* (2006.01)
*H02B 1/20* (2006.01)
(Continued)

(52) U.S. Cl.
CPC ............... *H02B 1/04* (2013.01); *E04H 12/08* (2013.01); *H02B 1/20* (2013.01); *H02B 5/02* (2013.01)

(58) Field of Classification Search
None
See application file for complete search history.

(56) References Cited

U.S. PATENT DOCUMENTS

| 2,237,812 A | 4/1941 | De Blieux |
| 2,551,841 A | 5/1951 | Kepple et al. |

(Continued)

FOREIGN PATENT DOCUMENTS

| CH | 660094 | 3/1987 |
| CN | 103256337 | 8/2013 |

(Continued)

OTHER PUBLICATIONS

Amin, S. M., et al., "Toward a Smart Grid: Power Delivery for the 21st Century", *IEEE power & energy magazine*, vol. 3, No. 5, (Sep./Oct. 2005), pp. 34-41.

(Continued)

*Primary Examiner* — Courtney L Smith
(74) *Attorney, Agent, or Firm* — Womble Bond Dickinson (US) LLP

(57) ABSTRACT

A modular, space-efficient support structure mounts multiple electrical devices. The structure is modular to allow for subsequent addition and removal of electrical devices by adding and removing primary structural elements coupled for structural efficiency. The structure is deployable in many locations without reconfiguration and has reduced dependence on local site conditions. The structure uses non-permanent construction methods to facilitate rapid assembly, disassembly, re-deployment and re-use of components. Multiple electrical devices such as transformers are mounted at elevation on device mounting columns. The electrical devices are interconnected to each other in parallel or series with connectors mounted on the top portion of the device to allow maintenance clearance underneath. The arrangement of the electrical devices maximizes the density of the devices while maintaining vertical, lateral and radial safety clearances. The electrical devices are arranged in a sym- (Continued)

metrical fashion around the primary structural element for symmetrical load distribution.

22 Claims, 15 Drawing Sheets

(51) Int. Cl.
    *E04H 12/08* (2006.01)
    *H02B 5/02* (2006.01)

(56) References Cited

U.S. PATENT DOCUMENTS

| | | | |
|---|---|---|---|
| 3,556,310 A | | 1/1971 | Loukotsky |
| 3,704,001 A | * | 11/1972 | Sloop .................... H02B 5/02 211/107 |
| 3,750,992 A | * | 8/1973 | Johnson ................. H01F 27/06 211/107 |
| 3,913,003 A | | 10/1975 | Felkel |
| 4,025,824 A | * | 5/1977 | Cheatham ............... H02B 5/02 174/45 R |
| 4,057,736 A | | 11/1977 | Jeppson |
| 4,103,853 A | * | 8/1978 | Bannan ................... H02B 5/02 211/107 |
| 4,164,345 A | | 8/1979 | Arnold et al. |
| 4,200,899 A | * | 4/1980 | Volman .................. H02B 5/02 361/602 |
| 4,277,639 A | | 7/1981 | Olsson |
| 4,286,207 A | | 8/1981 | Spreadbury et al. |
| 4,323,722 A | | 4/1982 | Winkelman |
| 4,367,512 A | | 1/1983 | Fujita |
| 4,514,950 A | | 5/1985 | Goodson, Jr. |
| 4,562,360 A | | 12/1985 | Fujimoto |
| 4,577,826 A | | 3/1986 | Bergstrom et al. |
| 4,710,850 A | | 12/1987 | Jahn et al. |
| 4,821,138 A | | 4/1989 | Nakano et al. |
| 4,903,927 A | * | 2/1990 | Farmer ................... H01F 27/06 211/107 |
| 5,006,846 A | | 4/1991 | Granville et al. |
| 5,023,768 A | | 6/1991 | Collier |
| 5,032,738 A | | 7/1991 | Vithayathil |
| 5,193,774 A | * | 3/1993 | Rogers .................... H01F 27/06 211/107 |
| 5,461,300 A | | 10/1995 | Kappenman |
| 5,469,044 A | | 11/1995 | Gyugyi et al. |
| 5,513,061 A | | 4/1996 | Gelbien et al. |
| 5,610,501 A | | 3/1997 | Nelson et al. |
| 5,648,888 A | | 7/1997 | Le Francois et al. |
| 5,844,462 A | | 12/1998 | Rapoport et al. |
| 5,884,886 A | | 3/1999 | Hageli |
| 5,886,888 A | | 3/1999 | Akamatsu et al. |
| 5,986,617 A | | 11/1999 | McLellan |
| 6,088,249 A | | 7/2000 | Adamson |
| 6,134,105 A | | 10/2000 | Lueker |
| 6,147,581 A | | 11/2000 | Rancourt et al. |
| 6,215,653 B1 | | 4/2001 | Cochran et al. |
| 6,233,137 B1 | | 5/2001 | Kolos et al. |
| 6,335,613 B1 | | 1/2002 | Sen et al. |
| 6,486,569 B2 | | 11/2002 | Couture |
| 6,727,604 B2 | | 4/2004 | Couture |
| 6,831,377 B2 | | 12/2004 | Yampolsky et al. |
| 6,895,373 B2 | | 5/2005 | Garcia et al. |
| 6,914,195 B2 | | 7/2005 | Archambault et al. |
| 7,090,176 B2 | | 8/2006 | Chavot et al. |
| 7,091,703 B2 | | 8/2006 | Folts et al. |
| 7,105,952 B2 | | 9/2006 | Divan et al. |
| 7,193,338 B2 | | 3/2007 | Ghali |
| 7,352,564 B2 | | 4/2008 | Courtney |
| 7,460,931 B2 | | 12/2008 | Jacobson |
| 7,642,757 B2 | | 1/2010 | Yoon et al. |
| 7,688,043 B2 | | 3/2010 | Toki et al. |
| 7,834,736 B1 | | 11/2010 | Johnson et al. |
| 7,835,128 B2 | | 11/2010 | Divan et al. |
| 7,932,621 B1 | | 4/2011 | Spellman |
| 8,019,484 B2 | | 9/2011 | Korba et al. |
| 8,249,836 B2 | | 8/2012 | Yoon et al. |
| 8,270,558 B2 | | 9/2012 | Dielissen |
| 8,310,099 B2 | | 11/2012 | Engel et al. |
| 8,401,709 B2 | | 3/2013 | Cherian et al. |
| 8,441,778 B1 | | 5/2013 | Ashmore |
| 8,497,592 B1 | | 7/2013 | Jones |
| 8,680,720 B2 | | 3/2014 | Schauder et al. |
| 8,681,479 B2 | | 3/2014 | Englert et al. |
| 8,816,527 B1 | | 8/2014 | Ramsay et al. |
| 8,825,218 B2 | | 9/2014 | Cherian et al. |
| 8,867,244 B2 | | 10/2014 | Trainer et al. |
| 8,872,366 B2 | | 10/2014 | Campion et al. |
| 8,890,373 B2 | | 11/2014 | Savolainen et al. |
| 8,896,988 B2 | | 11/2014 | Subbaiahthever et al. |
| 8,922,038 B2 | | 12/2014 | Bywaters et al. |
| 8,957,752 B2 | | 2/2015 | Sharma et al. |
| 8,996,183 B2 | | 3/2015 | Forbes, Jr. |
| 9,099,893 B2 | | 8/2015 | Schmiegel et al. |
| 9,124,100 B2 | | 9/2015 | Ukai et al. |
| 9,124,138 B2 | | 9/2015 | Mori et al. |
| 9,130,458 B2 | | 9/2015 | Crookes et al. |
| 9,172,246 B2 | | 10/2015 | Ramsay et al. |
| 9,178,456 B2 | | 11/2015 | Smith et al. |
| 9,185,000 B2 | | 11/2015 | Mabilleau et al. |
| 9,207,698 B2 | | 12/2015 | Forbes, Jr. |
| 9,217,762 B2 | | 12/2015 | Kreikebaum et al. |
| 9,246,325 B2 | | 1/2016 | Coca Figuerola et al. |
| 9,325,173 B2 | | 4/2016 | Varma et al. |
| 9,331,482 B2 | | 5/2016 | Huang |
| 9,563,218 B2 | | 2/2017 | Hall et al. |
| 9,659,114 B2 | | 5/2017 | He et al. |
| 9,843,176 B2 | | 12/2017 | Gibson et al. |
| 2002/0005668 A1 | | 1/2002 | Couture |
| 2002/0042696 A1 | | 4/2002 | Garcia et al. |
| 2003/0006652 A1 | | 1/2003 | Couture |
| 2003/0098768 A1 | | 5/2003 | Hoffmann et al. |
| 2004/0153215 A1 | | 8/2004 | Kearney et al. |
| 2004/0217836 A1 | | 11/2004 | Archambault et al. |
| 2005/0052801 A1 | | 3/2005 | Ghali |
| 2005/0073200 A1 | | 4/2005 | Divan et al. |
| 2005/0194944 A1 | | 9/2005 | Folts et al. |
| 2005/0205726 A1 | | 9/2005 | Chavot et al. |
| 2006/0085097 A1 | | 4/2006 | Courtney |
| 2007/0135972 A1 | | 6/2007 | Jacobson |
| 2007/0250217 A1 | | 10/2007 | Yoon et al. |
| 2008/0103737 A1 | | 5/2008 | Yoon et al. |
| 2008/0157728 A1 | | 7/2008 | Toki et al. |
| 2008/0177425 A1 | | 7/2008 | Korba et al. |
| 2008/0278976 A1 | | 11/2008 | Schneider et al. |
| 2008/0310069 A1 | | 12/2008 | Divan et al. |
| 2009/0243876 A1 | | 10/2009 | Lilien et al. |
| 2009/0281679 A1 | | 11/2009 | Taft et al. |
| 2010/0026275 A1 | | 2/2010 | Walton |
| 2010/0177450 A1 | | 7/2010 | Holcomb et al. |
| 2010/0213765 A1 | | 8/2010 | Engel et al. |
| 2010/0302744 A1 | | 12/2010 | Englert et al. |
| 2011/0060474 A1 | | 3/2011 | Schmiegel et al. |
| 2011/0095162 A1 | * | 4/2011 | Parduhn ............... H02G 3/0493 248/519 |
| 2011/0106321 A1 | | 5/2011 | Cherian et al. |
| 2011/0172837 A1 | | 7/2011 | Forbes, Jr. |
| 2012/0105023 A1 | | 5/2012 | Schauder et al. |
| 2012/0146335 A1 | | 6/2012 | Bywaters et al. |
| 2012/0205981 A1 | | 8/2012 | Varma et al. |
| 2012/0242150 A1 | | 9/2012 | Ukai et al. |
| 2012/0255920 A1 | * | 10/2012 | Shaw ....................... H02B 5/02 211/26 |
| 2012/0293920 A1 | | 11/2012 | Subbaiahthever et al. |
| 2013/0002032 A1 | | 1/2013 | Mori et al. |
| 2013/0033103 A1 | | 2/2013 | McJunkin et al. |
| 2013/0044407 A1 | | 2/2013 | Byeon et al. |
| 2013/0094264 A1 | | 4/2013 | Crookes et al. |
| 2013/0128636 A1 | | 5/2013 | Trainer et al. |
| 2013/0166085 A1 | | 6/2013 | Cherian et al. |
| 2013/0169044 A1 | | 7/2013 | Stinessen et al. |
| 2013/0182355 A1 | | 7/2013 | Coca Figuerola et al. |
| 2013/0184894 A1 | | 7/2013 | Sakuma et al. |
| 2013/0200617 A1 | | 8/2013 | Smith et al. |

(56) References Cited

U.S. PATENT DOCUMENTS

| | | |
|---|---|---|
| 2013/0249321 A1 | 9/2013 | Gao et al. |
| 2013/0277082 A1 | 10/2013 | Hyde et al. |
| 2013/0345888 A1 | 12/2013 | Forbes, Jr. |
| 2014/0008982 A1 | 1/2014 | Powell et al. |
| 2014/0025217 A1 | 1/2014 | Jin et al. |
| 2014/0032000 A1 | 1/2014 | Chandrashekhara et al. |
| 2014/0111297 A1 | 4/2014 | Earhart et al. |
| 2014/0129195 A1 | 5/2014 | He et al. |
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0266288 A1 | 9/2014 | Trabacchin et al. |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1* | 7/2015 | Bushore .................. E02D 27/42 52/831 |
| 2015/0226772 A1 | 8/2015 | Kreikebaum et al. |
| 2015/0244307 A1 | 8/2015 | Cameron |
| 2015/0270689 A1 | 9/2015 | Gibson et al. |
| 2016/0036231 A1 | 2/2016 | Ramsay et al. |
| 2016/0036341 A1 | 2/2016 | Jang et al. |
| 2017/0163036 A1 | 6/2017 | Munguia et al. |
| 2017/0169928 A1 | 6/2017 | Carrow et al. |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

Angeladas, Emmanouil , "High Voltage Substations Overview (part 1)", *Siemens*, (Jan. 24, 2013), pp. 1-8.

Aquino-Lugo, Angel A., "Distributed and Decentralized Control of the Power Grid", *Ph.D. Dissertation*, University of Illinois at Urbana-Champaign, (2010), 172 pp. total.

Dash, P. K., et al., "Digital Protection of Power Transmission Lines in the Presence of Series Connected FACTS Devices", *IEEE Power Engineering Society Winter Meeting*, (2000), pp. 1967-1972.

Divan, D. M., "Nondissipative Switched Networks for High-Power Applications", *Electronics Letters*, vol. 20, No. 7, (Mar. 29, 1984), pp. 277-279.

Funato, Hirohito , et al., "Realization of Negative Inductance Using Variable Active-Passive Reactance (VAPAR)", *IEEE Transactions on Power Electronics*, vol. 12, No. 4, (Jul. 1997), pp. 589-596.

Gyugyi, Laszlo , et al., "Status Synchronous Series Compensator: A Solid-State Approach to the Series Compensation of Transmission Lines", *IEEE Transactions on Power Delivery*, vol. 12, No. 1, (Jan. 1997), pp. 406-417.

Gyugyi, Laszlo , et al., "The Interline Power Flow Controller Concept: A New Approach to Power Flow Management in Transmission Systems", *IEEE Transactions on Power Delivery*, vol. 14, No. 3, (Jul. 1999), pp. 1115-1123.

Kavitha, M. , et al., "Integration of FACTS into Energy Storage Systems for Future Power Systems Applications", *International Journal of Advanced Research in Electrical, Electronics and Instrumentation Engineering*, vol. 2, Issue 2, (Feb. 2013), pp. 800-810.

Kumbhar, Mahesh M., et al., "Smart Grid: Advanced Electricity Distribution Network", *IOSR Journal of Engineering (IOSRJEN)*, vol. 2, Issue 6, (Jun. 2012), pp. 23-29.

Lambert, Frank C., "Power Flow Control", *ISGT Europe*, 2014, Istanbul, Turkey, (Oct. 13, 2014), pp. 1-15.

Lehmkoster, Carsten , "Security Constrained Optimal Power Flow for an Economical Operation of FACTS-Devices in Liberalized Energy Markets", *IEEE Transactions on Power Delivery*, vol. 17, No. 2, (Apr. 2002), pp. 603-608.

Mali, Bhairavanath N., et al., "Performance Study of Transmission Line Ferranti Effect and Fault Simulation Model Using MATLAB", *International Journal of Innovative Research in Electrical, Electronics, Instrumentation and Control Engineering*, vol. 4, Issue 4, (Apr. 2016), pp. 49-52.

Mutale, Joseph , et al., "Transmission Network Reinforcement Versus FACTS: An Economic Assessment", *IEEE Transactions on Power Systems*, vol. 15, No. 3, (Aug. 2000), pp. 961-967.

Ramchurn, Sarvapali D., et al., "Putting the 'Smarts' into the Smart Grid: A Grand Challenge for Artificial Intelligence", *Communications of the ACM*, vol. 55, No. 4, (Apr. 2012), pp. 86-97.

Reddy, D. M., et al., "FACTS Controllers Implementation in Energy Storage Systems for Advanced Power Electronic Applications—A Solution", *American Journal of Sustainable Cities and Society*, Issue 2, vol. 1, (Jan. 2013), pp. 36-63.

Renz, B. A., et al., "AEP Unified Power Flow Controller Performance", *IEEE Transactions on Power Delivery*, vol. 14, No. 4, (Oct. 1999), pp. 1374-1381.

Ribeiro, P. , et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, (Dec. 13, 2009), 11 pp. total.

Schauder, C. D., et al., "Operation of the Unified Power Flow Controller (UPFC) Under Practical Constraints", *IEEE Transactions on Power Delivery*, vol. 13, No. 2, (Apr. 1998), pp. 630-639.

Siemens SAS, "Portable Power Solutions, "Plug and play" High Voltage E-Houses, skids and mobile high voltage substations up to 420 kV", (Nov. 2015), 8 pages total.

Swain, S. C., et al., "Design of Static Synchronous Series Compensator Based Damping Controller Employing Real Coded Genetic Algorithm", *International Journal of Electrical, Computer, Energetic, Electronic and Communication Engineering*, vol. 5,.No. 3, (2011), pp. 399-407.

Xue, Yiyan , et al., "Charging Current in Long Lines and High-Voltage Cables—Protection Application Considerations", *67th Annual Georgia Tech Protective Relaying Conference*, Atlanta, Georgia, (May 8-10, 2013), pp. 1-17.

"International Search Report and Written Opinion of the International Searching Authority dated Jun. 28, 2017; International Application No. PCT/US2017/025802", (dated Jun. 28, 2017).

Albasri, Fadhel A. et al., "Performance Comparison of Distance Protection Schemes for Shung-FACTS Compensated Transmission Lines", IEEE Transactions on Power Delivery, vol. 22, No. 4, Oct. 2007, pp. 2116-2125.

Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.

Samantaray, S. R. , "A Data-Mining Model for Protection of FACTS-Based Transmission Line", IEEE Transactions on Power Delivery, vol. 28, No. 2, Apr. 2013, pp. 612-618.

\* cited by examiner

MODULAR, SPACE-EFFICIENT STRUCTURES MOUNTING MULTIPLE ELECTRICAL DEVICES

CROSS-REFERENCE TO RELATED APPLICATIONS

This application claims the benefit of U.S. Provisional Patent Application No. 62/326,240 filed Apr. 22, 2016.

BACKGROUND OF THE INVENTION

1. Field of the Invention

The present invention relates to systems and methods for mounting electrical equipment at an electrical substation.

2. Prior Art

An electrical substation is a part of an electrical generation, transmission, and distribution system. Substations transform voltage from one voltage level to another, or perform any of several other important functions. Between the generating station and consumer, electric power may flow through multiple types of substations with different functions operating at different voltage levels.

Electrical substations are expensive and time-consuming to deploy. An electrical substation may cost $60 million and take more than 5 years to deploy. The permit approval process may require multiple ecological and safety studies which slow down the overall deployment. An electrical substation usually contains multiple, heavy current and voltage-controlling devices such as transformers, capacitors, switches, etc. Electrical substations employ many different methods for mounting these current-controlling devices. Electrical substations are usually designed for a specific, permanent deployment and cannot easily be disassembled and re-deployed at a second location.

The current and voltage-controlling devices need to be mounted so they are easy to install and maintain. Each device has specific mounting requirements which include: operating voltage levels, orientation, device spacing and visibility or signal path. Each deployment of the support structure requires a full understanding of the local environmental, seismic and geotechnical conditions. The design of the mounting structure depends on the loads it will experience and the local geotechnical conditions. The soils ability to resist the load often has the greatest effect on the structural solution and selection.

Using the normal, industry-standard, structural-design practice, each support is designed to meet the unique conditions for the location it will be deployed in. This approach results in structural members, foundation mounting and anchoring conditions that are unique to each location and which cannot be disassembled and redeployed in another location without significant construction and reconfiguration costs. Most of the currently available designs either have a strong dependency on the local soil conditions requiring substantial customization or are structurally inefficient needing expensive and time consuming construction methods.

FIG. 1 (Prior Art, U.S. Pat. No. 6,215,653) shows a modular substation design that is easy to erect and disassemble. The transformer 23 is mounted on a central section of base 2 and flanked by structures 4 and 5. The design requires the base of the structure to be tied to all structural elements. In situation where numerous electrical devices need to be installed, the base restricts maintenance access. The beams needed to tie the columns together require steel members that are fairly high, e.g., ~12" or more. The beams become physical access barriers for maintenance equipment. Maintenance equipment cannot and should not drive over those structural members after they have been installed.

The maintenance requirement can be met by vertically mounting the electrical devices at an elevation. FIG. 2 (Prior Art, U.S. Pat. No. 3,556,310) shows vertical mounting of the electrical devices 13. However in medium-voltage (MV) and high-voltage (HV) applications, the electrical devices have horizontal spacing requirements that prevent close coupling of the device 13 and the structural members 12. While FIG. 5 (Prior Art, U.S. Pat. No. 4,277,639) addresses the use of electrical devices at elevation with the horizontal spacing requirement, it also supports each device with its own independent support. Transformer 1 is supported by insulators 14 and 16; and transformer 2 is supported by insulator 24 and 26. This method leads to a structurally inefficient design when used in a configuration that requires multiple electrical devices. Each structure supports the device and resists the loads independently.

FIG. 3 (Prior Art, U.S. Pat. No. 4,710,850) and FIG. 4 (Prior Art, U.S. Pat. No. 4,577,826) show a completely different approach. Both provide electrical isolation in HV and MV applications through the use of an insulated, elevated substation. These implementations require the use of structural insulators as the primary force resisting elements. In FIG. 3 stories 2, 4, 6, 8, 10 and 12 are connected to each other by outdoor-type insulators 27 which are connected to the node elements 24. In FIG. 4, platform 4 is supported by insulator columns 6. These structural insulators are expensive to use and are designed to meet the specific requirements of the application and location. Using the same structural insulators in a different application requires substantial redesign and cost.

Mounting MV and HV electrical devices at elevations provides safe access to the devices for installation, replacement and maintenance. The electrical device spacing clearance distances depend on the voltage levels. The spacing clearance provides electrical insulation and reduces mutual thermal radiation effects. The clearance and spacing requirements of electrical devices lead to tall structures with large foot prints. The larger structures result in longer spans and higher elevations requiring heavier and stronger structural members to resist the forces. The larger members result in higher fabrication and construction costs. Additionally, the larger footprints lead to secondary problems regarding land availability, acquisition, zoning constraints and permit requirements.

Currently mounting MV and HV devices on elevated structures is limited as in FIG. 5 (Prior Art, U.S. Pat. No. 4,277,639). FIG. 5 shows an electrical device centrally mounted on a structure and supported by insulators to achieve the elevation and clearance requirements. The electrical conductors are mounted horizontally and to the mid body of the device. The vertical, wind and earthquake loads on the transformer devices 1 and 2 are transferred to the A-frame structure through the use of insulators, 12, 16, 24 and 26. In order to install numerous devices a minimum amount of clearance is required radially from the conductors 4 and 5 to other conductors, structural components or devices on a different phase. While this option is viable for a small number of device deployments, it leads to accessibility and enlarged foot print issues when numerous devices need to be deployed in series or parallel.

There is a need for an electrical substation support structure that solves the described issues.

BRIEF DESCRIPTION OF THE DRAWINGS

The drawings are made to point out and distinguish the invention from the prior art. The objects, features and advantages of the invention are detailed in the description taken together with the drawings.

DETAILED DESCRIPTION OF THE PREFERRED EMBODIMENTS

There is a need for an electrical substation support structure supporting multiple heavy electrical devices with a standard, modular approach that speeds the permit approval process; provides easy addition and removal of devices; re-usability with easy assembly, disassembly, and redeployment; easy maintenance access; satisfy different electrical device mounting and clearance requirements; and offer low-cost by being inexpensive to construct, structurally efficient and having a compact footprint.

The modular, space-efficient structure uses multiple device mounting columns to mount electrical equipment such as transformers or other electrical devices at an elevation. Such electrical devices might be step down transformers and/or other devices for distribution of the power received at a substation for local distribution at one or more lower voltages, though may include current and/or voltage affecting devices for such purposes as lightning and other spike suppression, power factor correction, phase balancing, harmonics suppression, loop current suppression and switching, to name some of the other electrical devices that might be used. The device mounting columns are bolted to (or cast into) a typically concrete foundation. The device mounting columns receive structural support from bolted or welded horizontal beams and reinforcement struts when required. Having a variable number of device mounting columns that can be added or subtracted provides modularity. Using bolted connections (and to a lesser extent welded connections) makes it easy to assemble and disassemble. Welded connections can be pulled apart and the components can usually be re-used. The columns, beams and reinforcement struts are made of light-weight steel making them low-cost and easy to transport. The modular, space-efficient structure uses standard components designed for applicable conditions making it possible to use the same components in different locations with different soil conditions. The modular, space-efficient structure supports multiple electrical devices, such as transformers, mounted radially from the device mounting columns to meet the necessary device clearances. The elevated radial arrangement minimizes the overall substation footprint, allows ease of access for maintenance or installation and provides structural stability by balancing the lateral forces applied to each column. This standard approach to substation construction simplifies the permit approval process reducing the overall deployment schedule and makes it possible to have temporary substation installations.

Figure 1:
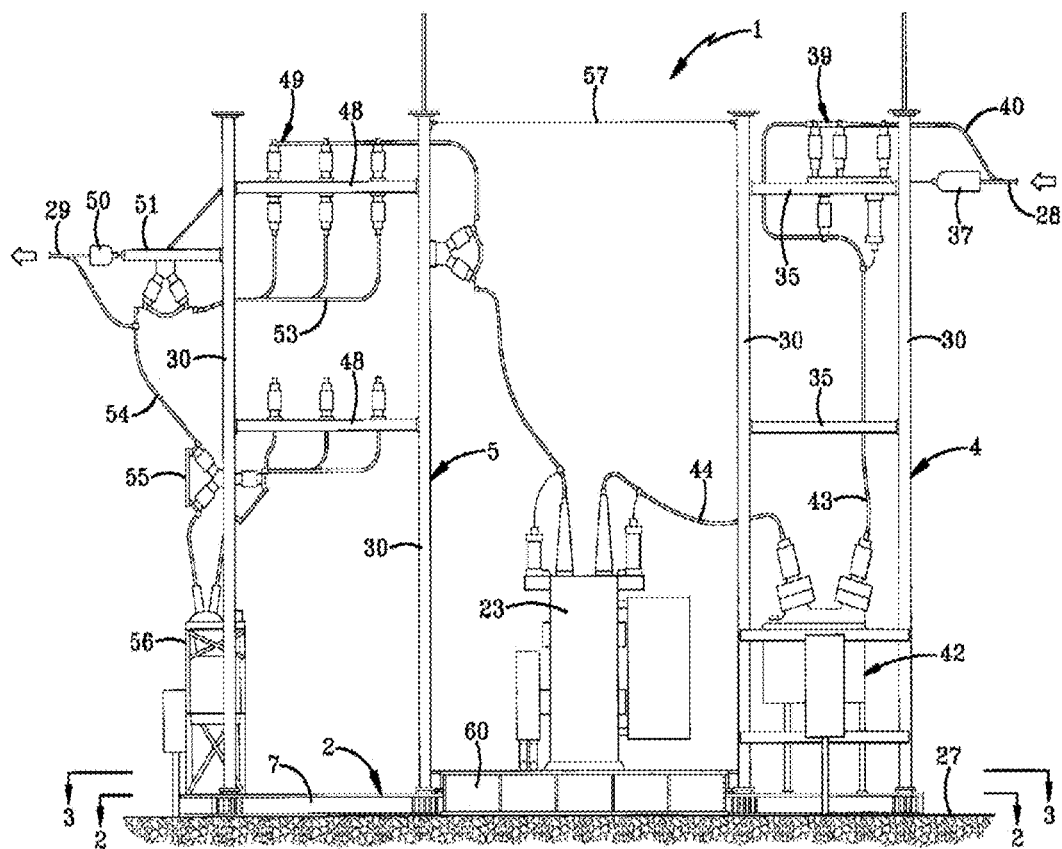
FIG. 1 shows a representation of a modular electrical substation from U.S. Pat. No. 6,215,653 (prior art).
Figure 2:
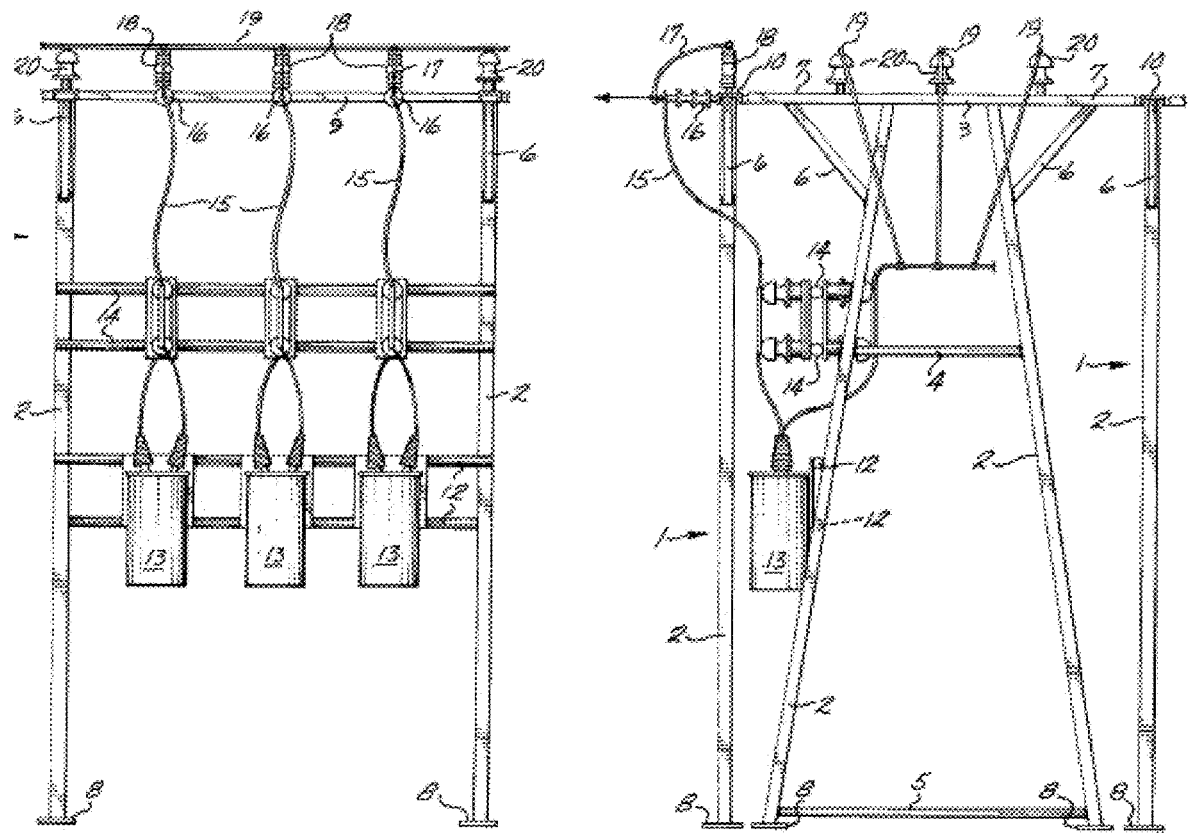
FIG. 2 shows a representation of an elevated structure for mounting electrical devices from U.S. Pat. No. 3,556,310 (prior art).
Figure 3:
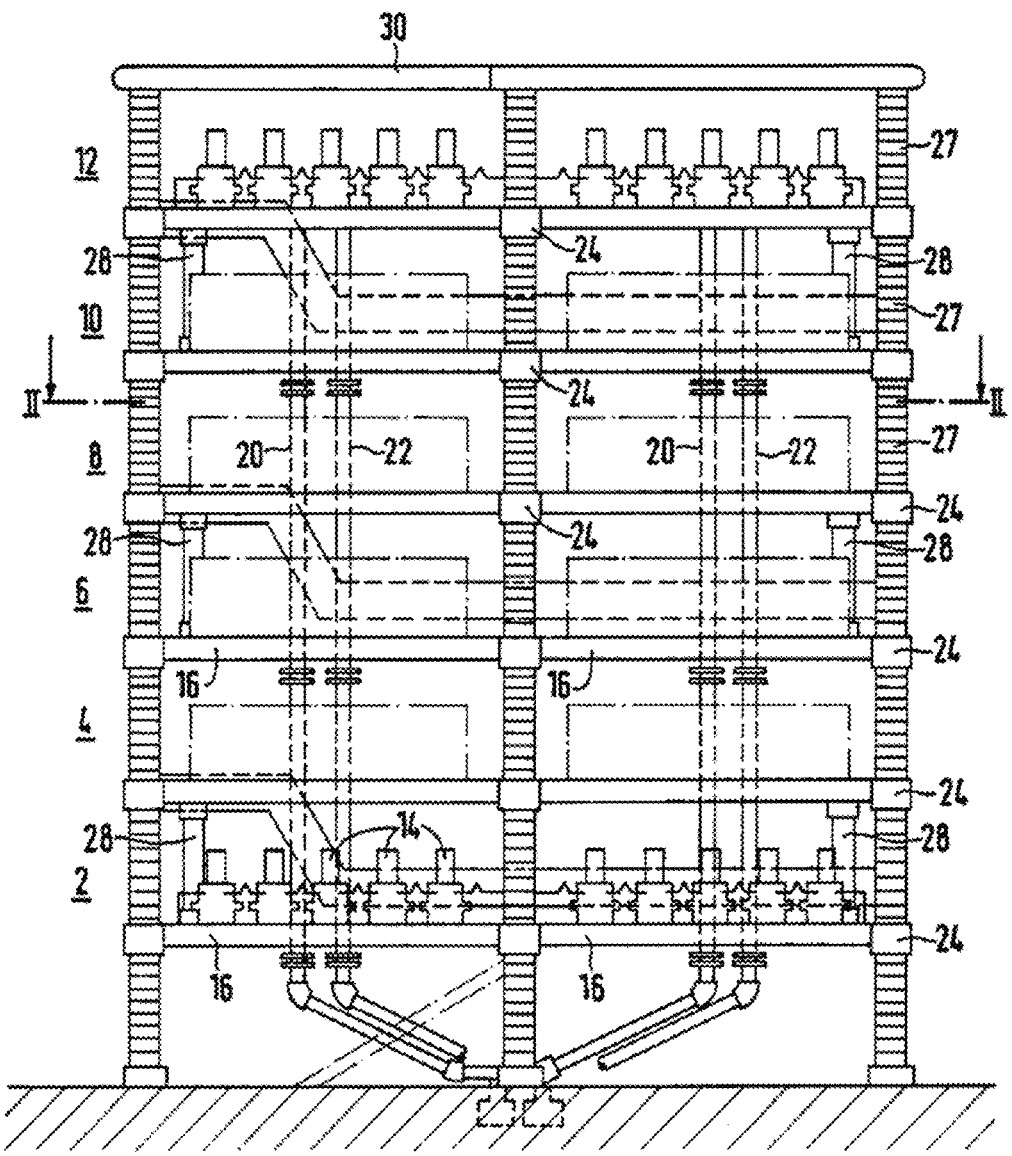
FIG. 3 shows a representation of a tower design for high voltage systems from U.S. Pat. No. 4,710,850 (prior art).
Figure 4:
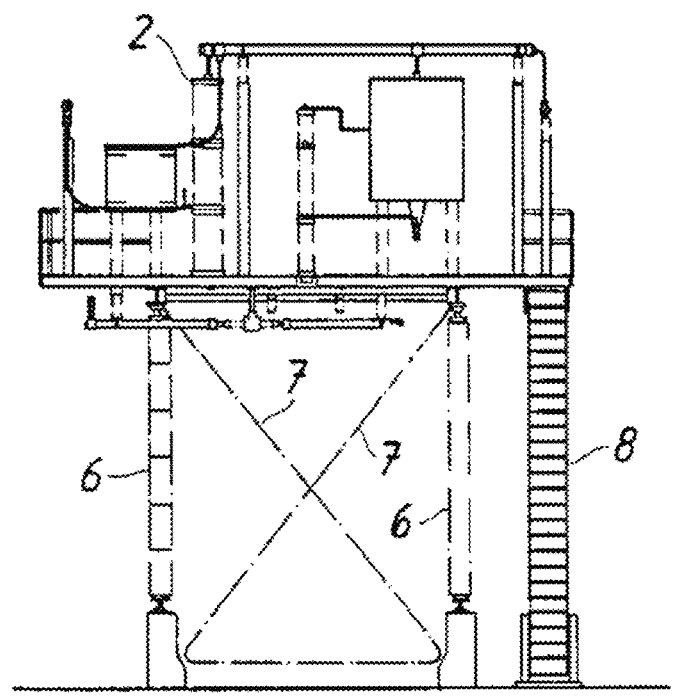
FIG. 4 shows a representation of a stand structure for supporting electrical high voltage equipment from U.S. Pat. No. 4,577,826 (Prior art).
Figure 5:
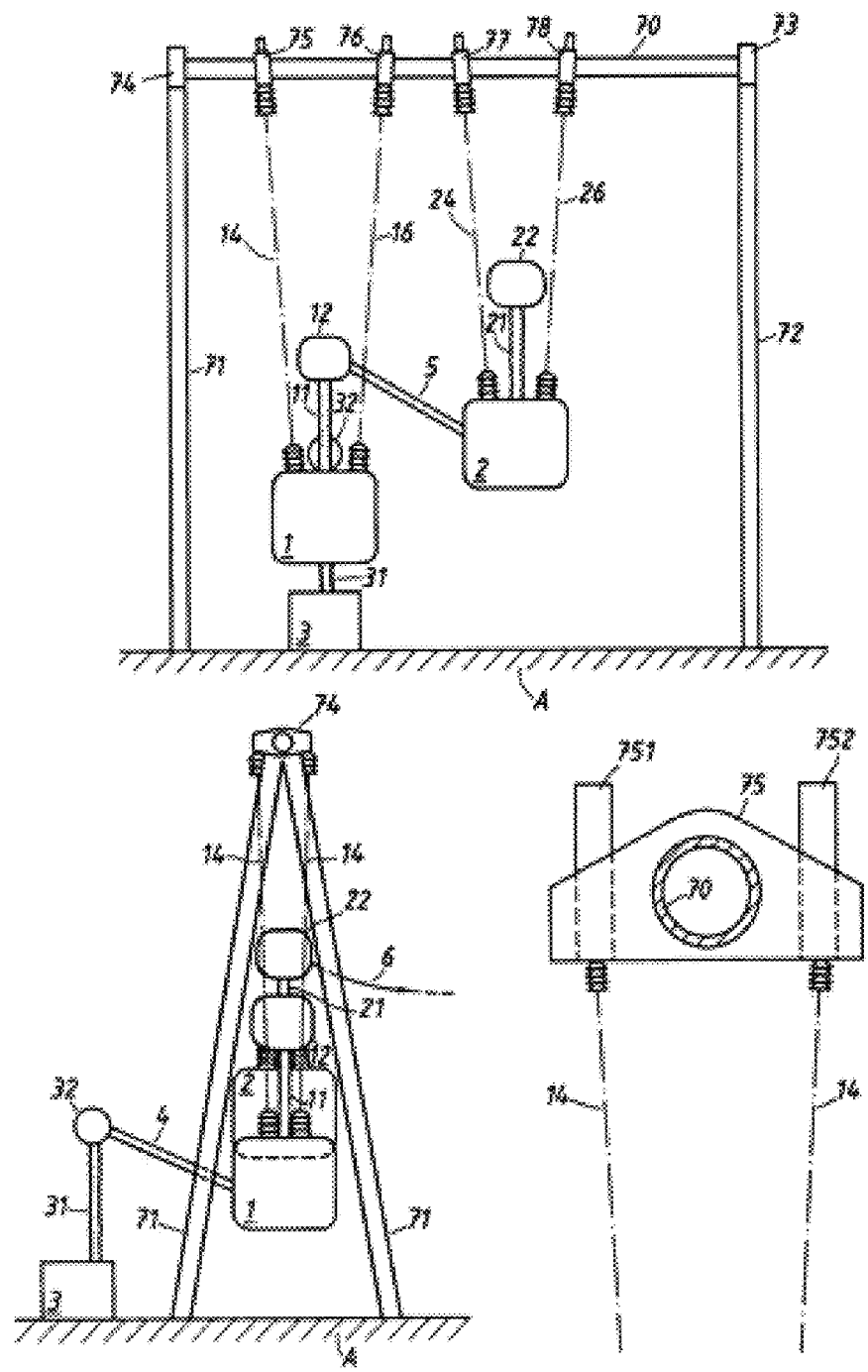
FIG. 5 shows a representation of a high voltage device suspended by insulators from a structure from U.S. Pat. No. 4,277,639 (prior art).
Figure 6:
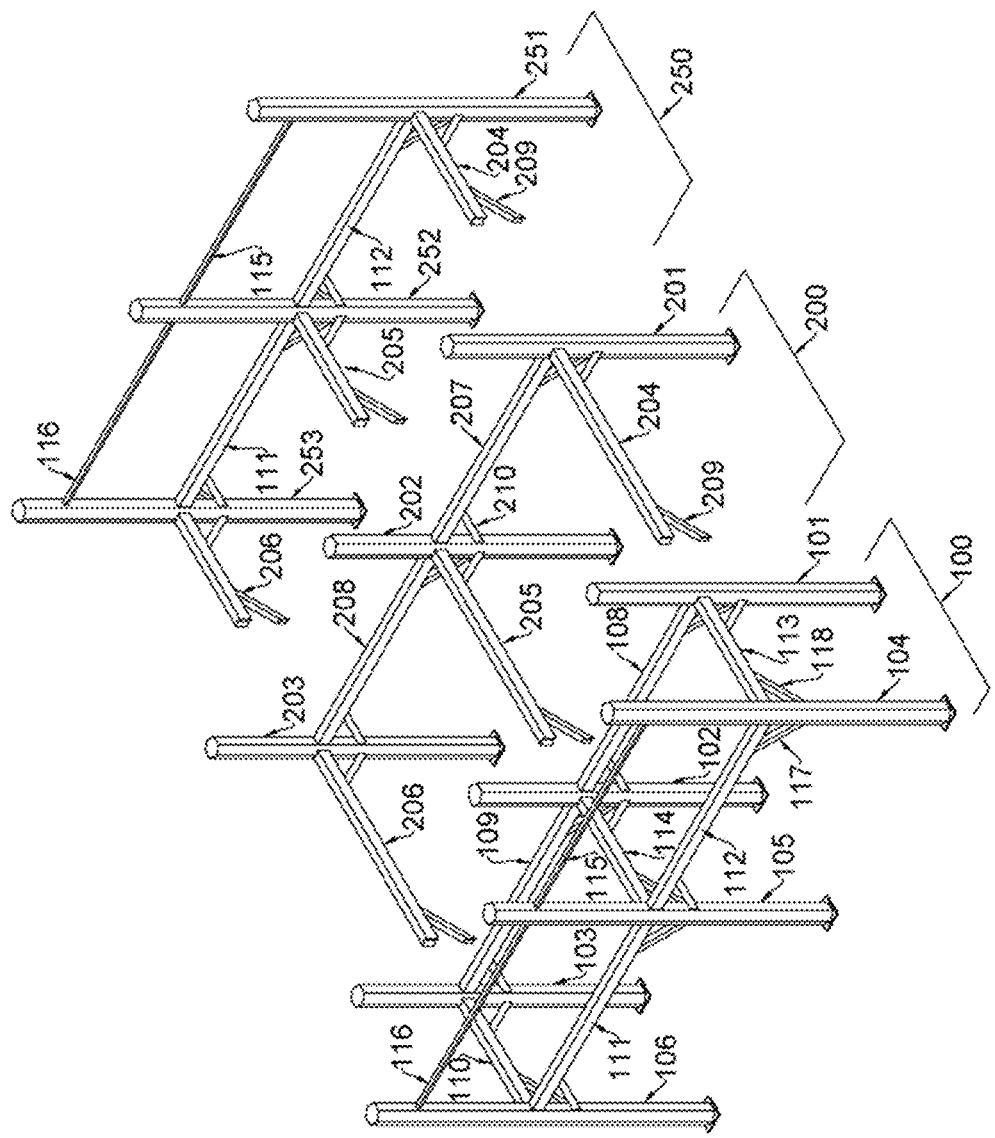
FIG. 6 shows an exemplary, modular, space-efficient structure for mounting multiple electrical devices.

FIG. 6 shows an exemplary, modular, space-efficient structure for mounting electrical devices in areas with seismic activity or high winds. The primary load bearing sections 100 and 250 are connected with zero or more expansion sections 200 connected in the middle. Expansion sections 200 are added or removed to match the number of required electrical devices. In this example structure, primary load bearing section 100, expansion section 200 and primary load bearing section 250 are bolted to one or more concrete foundation blocks. The primary load bearing section 100 consists of device mounting columns, 101, 102, 103 and load bearing columns 104, 105, and 106 that provide structural support and vertical support for electrical device mounting. The columns are tied together in a grid fashion with horizontal beams 108-114 and column cross-beams 115-116. Connections from beams to columns are shop fabricated bolted connections designed to act as a rigid moment resisting connections. Reinforcement struts 117, 118 and their equivalent mounted between the beams and the columns supplement the moment resisting connections and provide additional moment resistance as required.

In this example the load bearing columns 104, 105, 106, 251, 252 and 253 provide structural support for the frame and do not support electrical device mounting. The device mounting columns 101, 102 and 103 provide electrical device mounting. Load bearing columns 104, 105, 106, 251, 252 and 253 are bolted and/or cast into the foundation like the device mounting columns 101, 102 and 103. Expansion device mounting columns 201, 202 and 203 of expansion section 200 provide additional electrical device mounting capability. Expansion section 200 provides additional structural resistance through expansion horizontal beams 204, 205, and 206. The connections between primary load bearing section 100, expansion section 200 and primary load bearing section 250 are also moment resisting bolted connections with expansion reinforcement struts 209 and 210 to provide additional structural support.

Figure 10A:
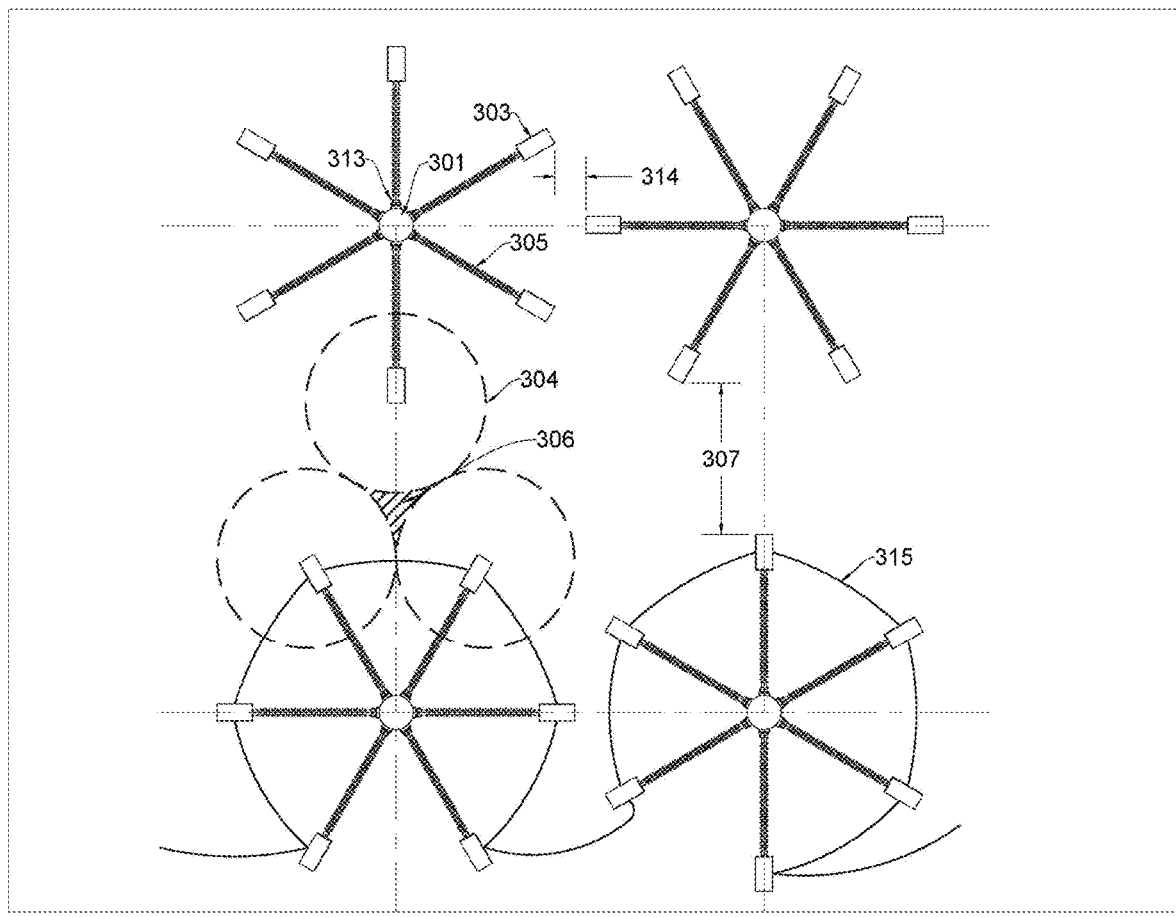
FIG. 10a shows exemplary Safety Clearance Zones for vertically mounted transformers.

The electrical devices (303 shown in FIG. 8) are mounted on device mounting columns corresponding to any of device mounting columns 101, 102 and 103 and connected to different phases of the power grid using an electrical conductor (315 of FIG. 10a). Each primary load bearing section 100 and expansion section 200 has three vertical columns because the power grid has different electrical conductors for each of its three different phases. In the embodiments disclosed herein, an even number of electrical devices are supported, though that is not a limitation of the invention, as in any embodiments shown herein, an odd number of devices and supporting insulators could be used.

FIG. 6 provides a specific embodiment well-suited to environments with potentially high horizontal stresses caused by seismic activity, winds, soil conditions or other factors. Many other embodiments are possible. In a second embodiment the device mounting columns are anchored by being embedded in concrete as steel piles. In an environment with lower horizontal stresses the reinforcement struts 117 and 118 and expansion reinforcement struts 209 and 210 can be omitted and the column to beam connections need not be rigid moment resisting connections using shop fabricated bolted connections. In an environment with even lower horizontal stresses, the horizontal beams 108-114, column cross-beams 115-116 and expansion horizontal beams 204-208 can be omitted altogether.

The modular, space-efficient structure has to fit within the designated property area. Primary load bearing section 100 and expansion section 200 may have a different number of device mounting columns if that is necessary to fit within the designated property area. In one example, primary load bearing section 100 and expansion section 200 have six electrical device mounting columns each where the electrical devices attached to the first 3 columns have electrical connections to the electrical devices attached to the second 3 columns.

Under difficult environment conditions, primary load bearing section 100 and expansion section 200 may have more structural support columns and/or fewer electrical device mounting columns.

Figure 7:
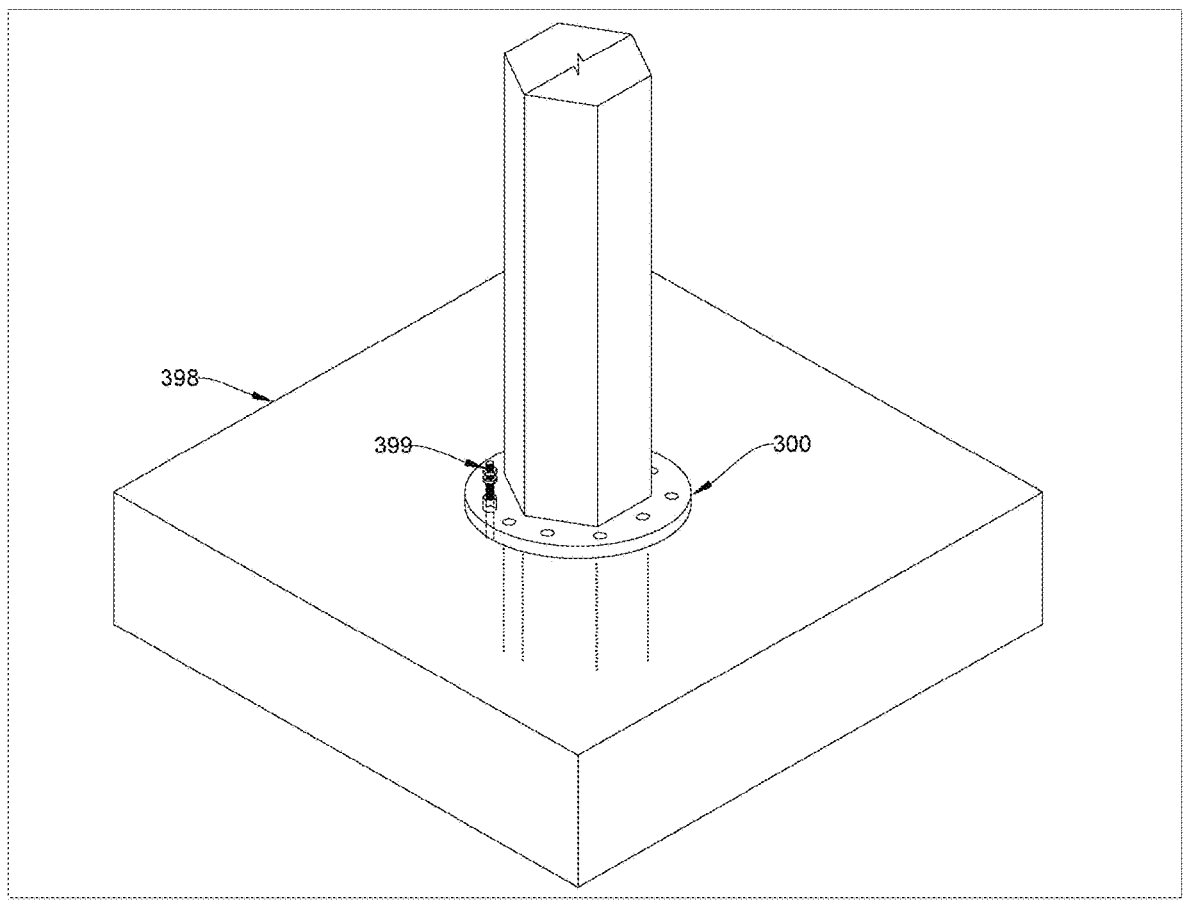
FIG. 7 shows an exemplary foundation connection for the modular, space-efficient structure.

FIG. 7 shows an exemplary foundation connection for the modular, space-efficient structure. Each vertical column has column anchor flange 300 and is connected to the foundation 398 using multiple column anchor bolts 399. In one embodiment the size of the column anchor flange 300, number of bolt holes, length of column anchor bolts 399 and material choice are designed to meet applicable design conditions. In another embodiment the modular, space-efficient structure is constructed from a small number of component choices. In this embodiment the structure designer can select from a small number of possible columns of different types, beams of different types, connections of different types and bolts of different types to meet different requirements. The different column types will have different material, different flanges and different numbers of bolt holes. The vertical column may optionally be embedded in the concrete foundation 398 as shown in FIG. 7. Embedding the vertical column in the concrete foundation makes it more difficult to re-use the vertical column but the vertical column can be sawn off at the base or dug out of the concrete. When the vertical column is embedded in the concrete foundation the column anchor flange 300 is optional.

Table 1 summarizes the components shown in FIGS. 6 and 7.

TABLE 1

| FIG. Label: | Description |
| --- | --- |
| 100 | Primary load bearing section |
| 101-103 | Device mounting columns |
| 104-106 | Load bearing columns |
| 108-114 | Horizontal beams |
| 115-116 | Column cross-beams |
| 117, 118 | Reinforcement struts |
| 200 | Expansion section |
| 201-203 | Expansion device mounting columns |
| 204-208 | Expansion horizontal beams |
| 209, 210 | Expansion reinforcement struts |
| 300 | Column Anchor flange |
| 398 | Foundation |

TABLE 1-continued

| FIG. Label: | Description |
| --- | --- |
| 399 | Column Anchor bolt |
| 250 | Primary load bearing section |
| 251-253 | Load bearing columns |

Figure 8:
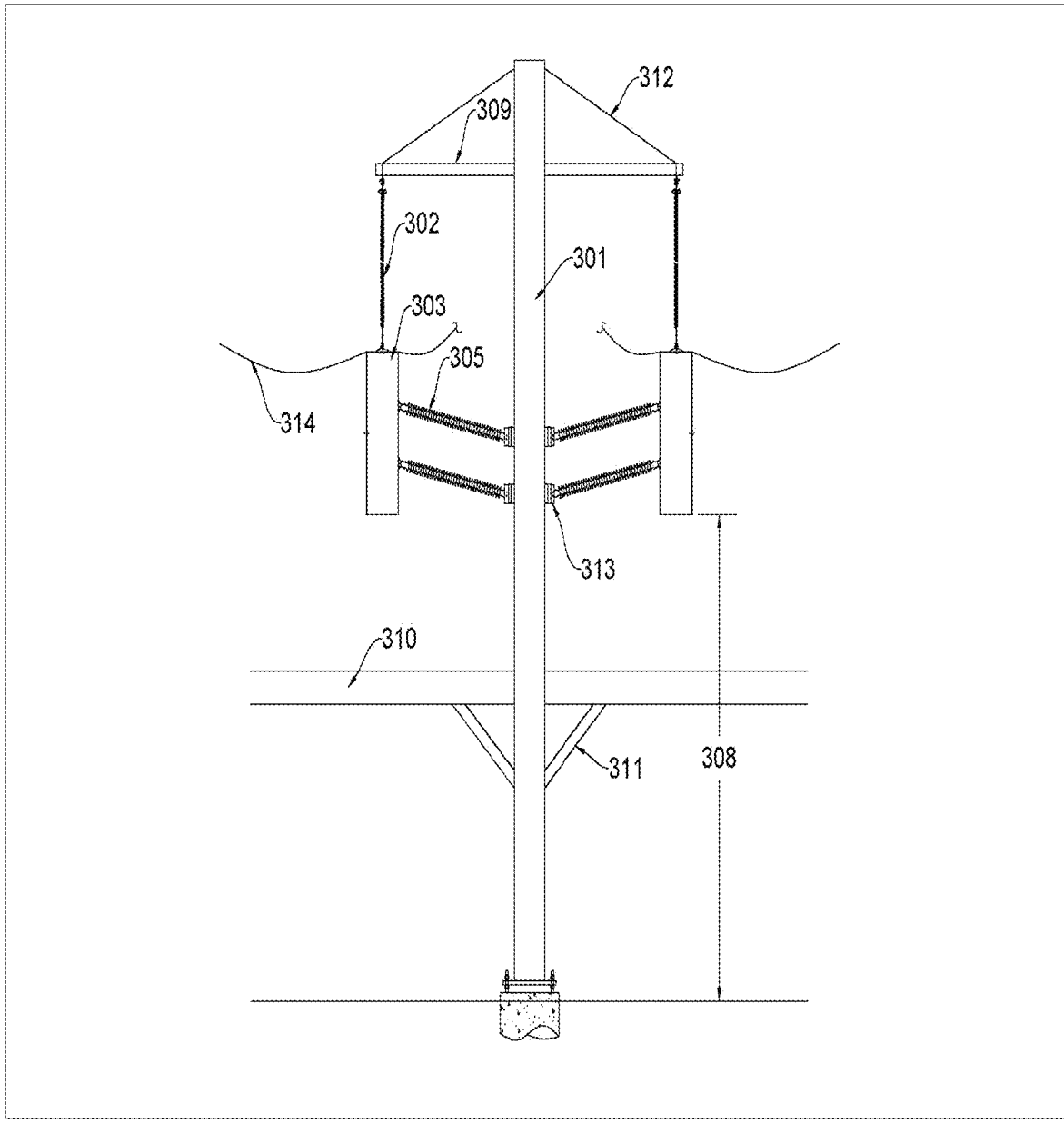
FIG. 8 shows an example of vertically mounted transformers with an exemplary vertical clearance.

The modular, space-efficient structure supports electrical devices with different mounting orientations and different safety clearances. FIG. 8 shows an example of vertically mounted transformers with an exemplary vertical clearance. FIG. 8 shows an electrical device 303 mounted on device mounting column 301. In this first embodiment of the support structure the electrical device 303 is supported vertically by the device mounting column 301 using a beam and tie assembly, 309 and 312 respectively which may be in the form of a simple truss structure, and vertical apparatus support and electrical insulator 302. As a truss structure, tie member 312 is always in tension, so can be a beam like member or even a cable or chain (tension resisting only). The electrical device 303 is further insulated from device mounting column 301 using lateral device structural support and electrical insulator 305. Lateral device structural support and electrical insulator 305 connects to the device mounting column 301 using structural support attachment 313. Structural support attachment 313 is typically an industry-standard weld or a bolted bracket. In a second embodiment of the support structure, shown later in FIG. 10c, the device is supported directly by the device mounting column 301 through the use of one or more insulators. The device mounting columns, 301, are themselves supported using support beams and reinforcement struts, 310 and 311 respectively in a grid type. Electrical device 303 has the required minimum vertical safety clearance 308. FIG. 8 shows conductor 315 connected to the power grid and to the top of electrical devices 303 allowing unrestricted maintenance access from below.

Figure 9:
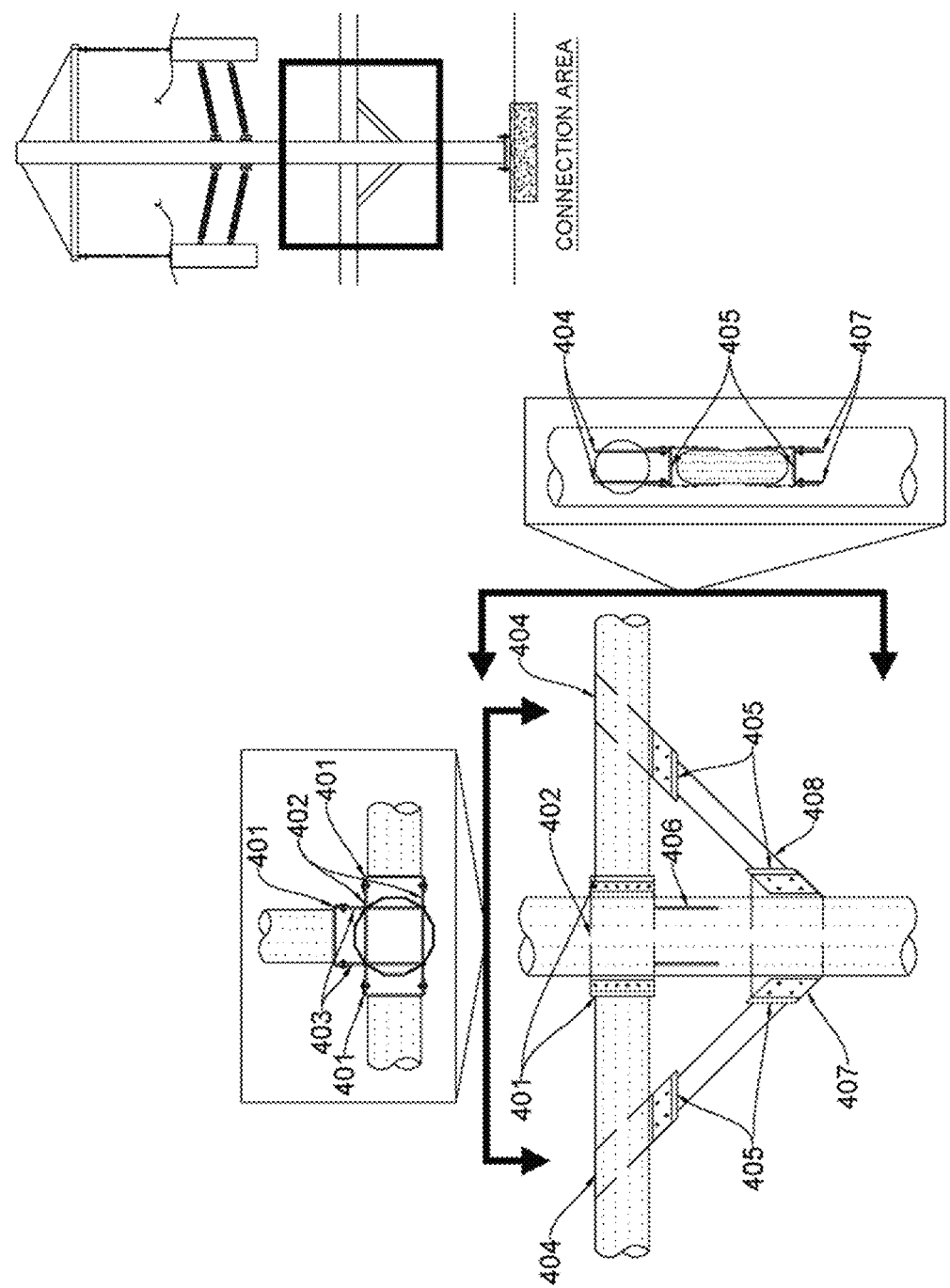
FIG. 9 shows exemplary beam and column connections.

FIG. 9 shows exemplary horizontal beam and device mounting column connections via expanded top, front and side views. Table 2 summarizes the components that connect the horizontal beams to a device mounting column. Bent plate 401 is welded to the cross beam and bolted to longitudinal through-plate 402 and transverse through-plate 403. The transverse through-plate 403 passes through the column supporting cross beam, and is staggered from the longitudinal through plates 402. Reinforcement strut 408 connects to the device mounting column by welding bent plate 405 to the reinforcement strut and then bolting bent plate 405 to through-plate 407. Reinforcement strut 408 connects to the horizontal beam by welding bent plate 405 to the reinforcement strut and then bolting bent plate 405 to through-plate 404. The connection component dimensions including thicknesses, size and shape depend on the electrical devices being mounted.

TABLE 2

| FIG. Label: | Description |
| --- | --- |
| 401 | Bent plate welded to cross arm, bolted to through plate |
| 402 | Longitudinal through plates |
| 403 | Transverse through plates |
| 404 | Through plates for reinforcement strut |
| 405 | Bent plate welded to brace, bolted to plates |
| 406 | Transverse knife plate through column supporting cross arm, staggered from longitudinal through plates |
| 407 | Through plates for reinforcement strut |
| 408 | Reinforcement strut |

FIG. 10a shows exemplary safety clearance zones for vertically mounted transformers. Electrical devices 303 are mounted on device mounting column 301 using lateral device structural support and electrical insulator 305 which also provides electrical isolation. The primary structural element, device mounting column 301 is symmetrically loaded around the vertical axis to reduce unbalanced loads on the structural element. This in turn reduces the amount of material needed to resist the forces acting on the structure.

The modular, space-efficient structure uses multiple electrically isolating beams, struts or lateral device structural support and electrical insulators 305 to provide lateral and vertical support. The insulators also provide the lateral distance needed to meet clearance requirements to other devices and device mounting column 301, beam 309 and support beam 310. The lateral and vertical insulators are mounted radially on device mounting column 301 with a structural support attachment 313 or equivalent. The lateral device structural support and electrical insulators 305 are arranged to maximize the density of devices in a horizontal plane and reduce the interstitial spacing 306 while maintaining each device's radial and horizontal spacing clearance 304, horizontal spacing clearance 307, and lateral spacing clearance 314. In order to minimize the interstitial space and maximize the device density, the radial arrangement of the devices is quadrangular, hexagonal, octagonal or any symmetric configuration around their vertical axis.

The modular, space-efficient structure uses electrical conductors 315 mounted on the upper portion of the electrical device, 303, to provide access and reduce the clearance requirements to the lower portion of the required minimum vertical safety clearance 308. The electrical conductors 315 can be single, double or multiple conductors and typically connect to the power grid, and are connected to each electrical device 303 in a series or parallel configuration.

Table 3 summarizes the components shown in FIGS. 10*a*, 10*b*, 10*c* and 10*d*.

TABLE 3

| FIG. Label: | Description |
|---|---|
| 301 | Device mounting column |
| 302 | Vertical apparatus support and electrical insulator |
| 303 | Electrical device |
| 304 | Radial and horizontal spacing clearance |
| 305 | Lateral device structural support and electrical insulator |
| 306 | Interstitial spacing |
| 307 | Horizontal spacing clearance |
| 308 | Required minimum vertical safety clearance |
| 309 | Beam |
| 310 | Support beam |
| 311 | Reinforcement strut |
| 312 | Tie member |
| 313 | Structural support attachment |
| 314 | Lateral spacing clearance |
| 315 | Electrical Conductors |
| 316 | Device vertical spacing clearance requirement |

Figure 10B:
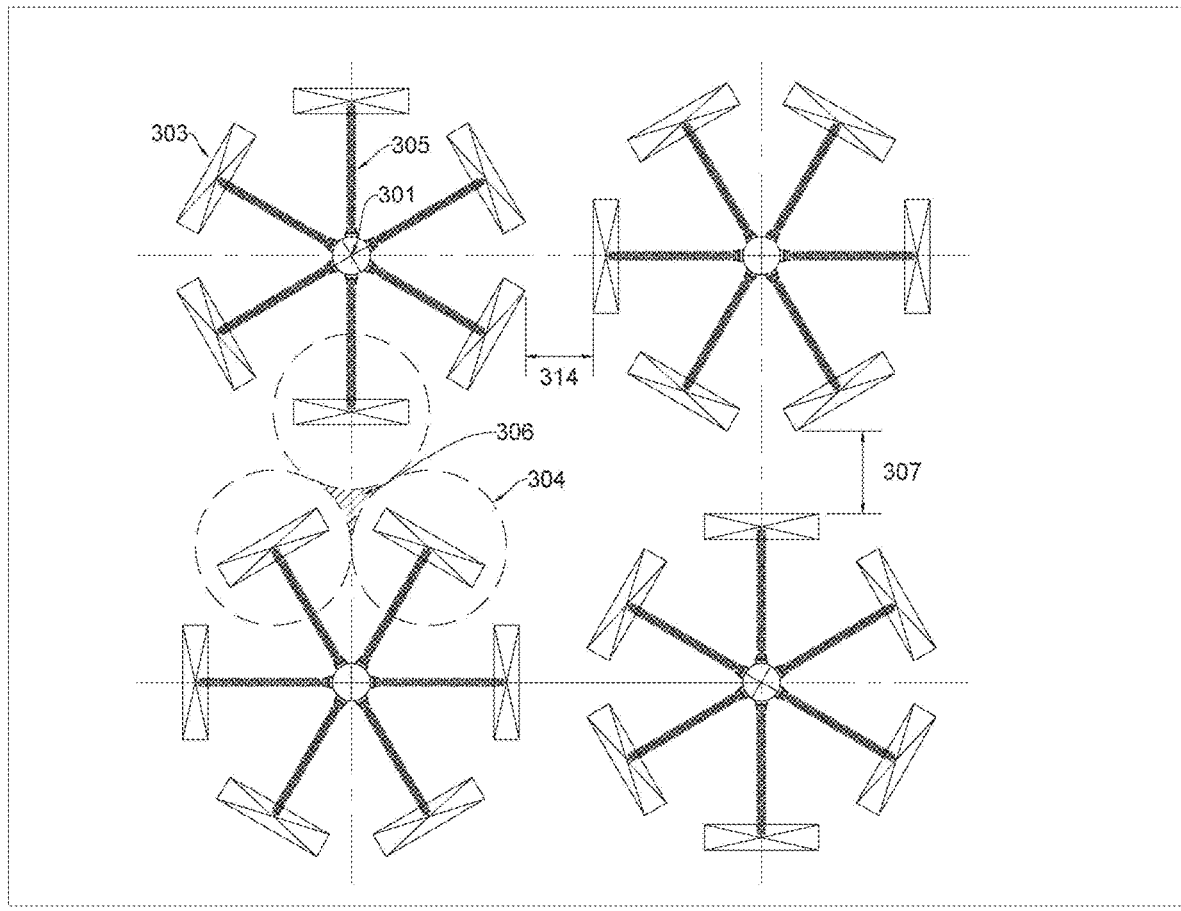
FIG. 10b shows exemplary Safety Clearance Zones for horizontally mounted transformers.

FIG. 10*b* shows a top view with exemplary safety clearance zones for horizontally mounted transformers. Horizontally mounted transformers have a larger footprint as made evident in the top view. FIG. 10*b* shows electrical device 303 supported by device mounting column 301 and the interstitial spacing 306 and required radial and horizontal spacing clearance 304, horizontal spacing clearance 307, and lateral spacing clearance 314. Minimizing the interstitial spacing 306 gives a greater density of transformers and minimizes the required footprint. The distance between vertical device mounting columns 301 is selected to minimize the interstitial spacing 306.

Figure 10C:
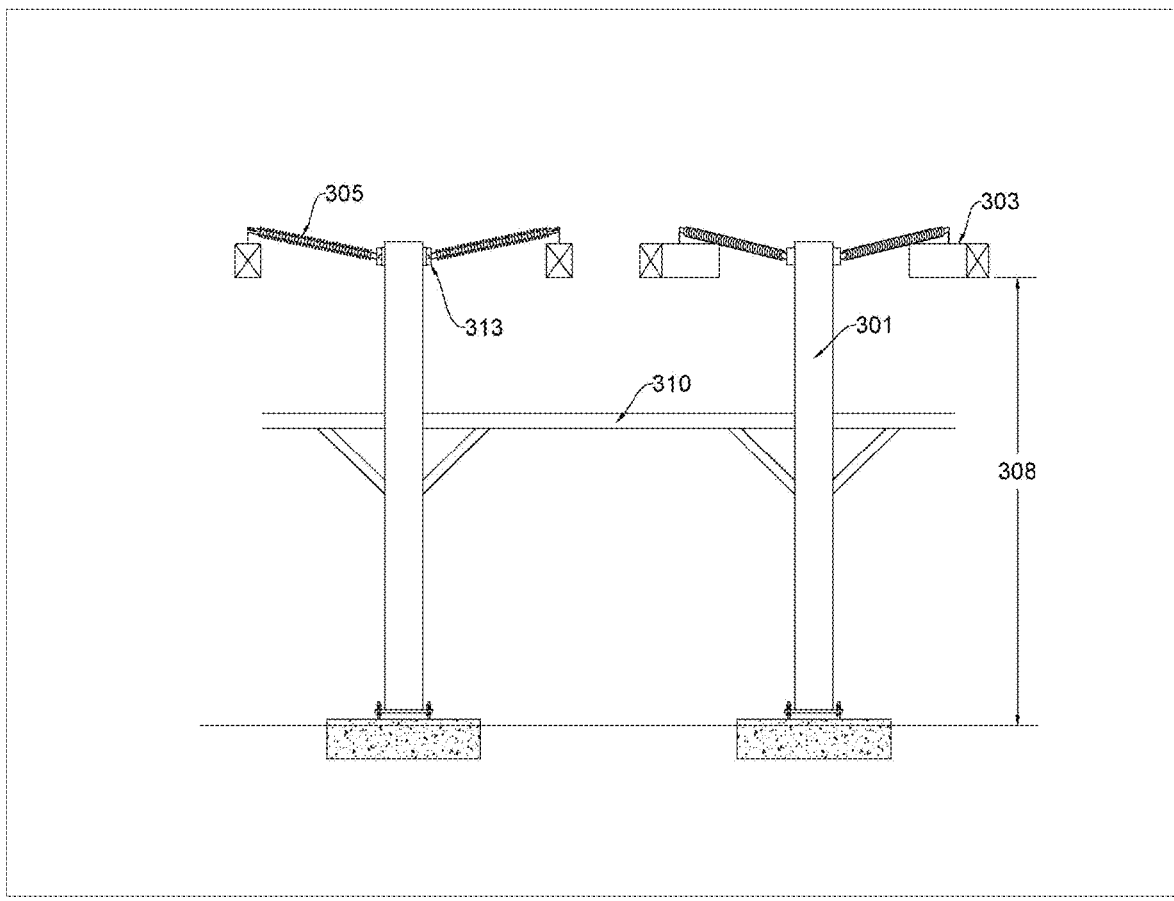
FIG. 10c shows exemplary Vertical Safety Clearance Zones for horizontally mounted transformers.

FIG. 10*c* shows a side view with exemplary vertical safety clearance zones for horizontally mounted transformers. Electrical devices 303 are mounted using lateral device structural support and electrical insulator 305 which also provides electrical isolation. The required minimum vertical safety clearance 308 defines the minimum elevation for mounting the transformer. FIG. 8 shows the first embodiment of the support structure with the electrical device 303 supported vertically by the device mounting column 301 with a lateral device structural support and electrical insulator 305 anchored to a beam and tie assembly, 309 and 312 respectively. FIG. 10*c* shows a second embodiment of the support structure, the device is supported by the device mounting column 301 through the use of multiple lateral device structural support and electrical insulators 305 connected to structural support attachment 313 without the beam and tie assembly 309 and 312.

Figure 10D:
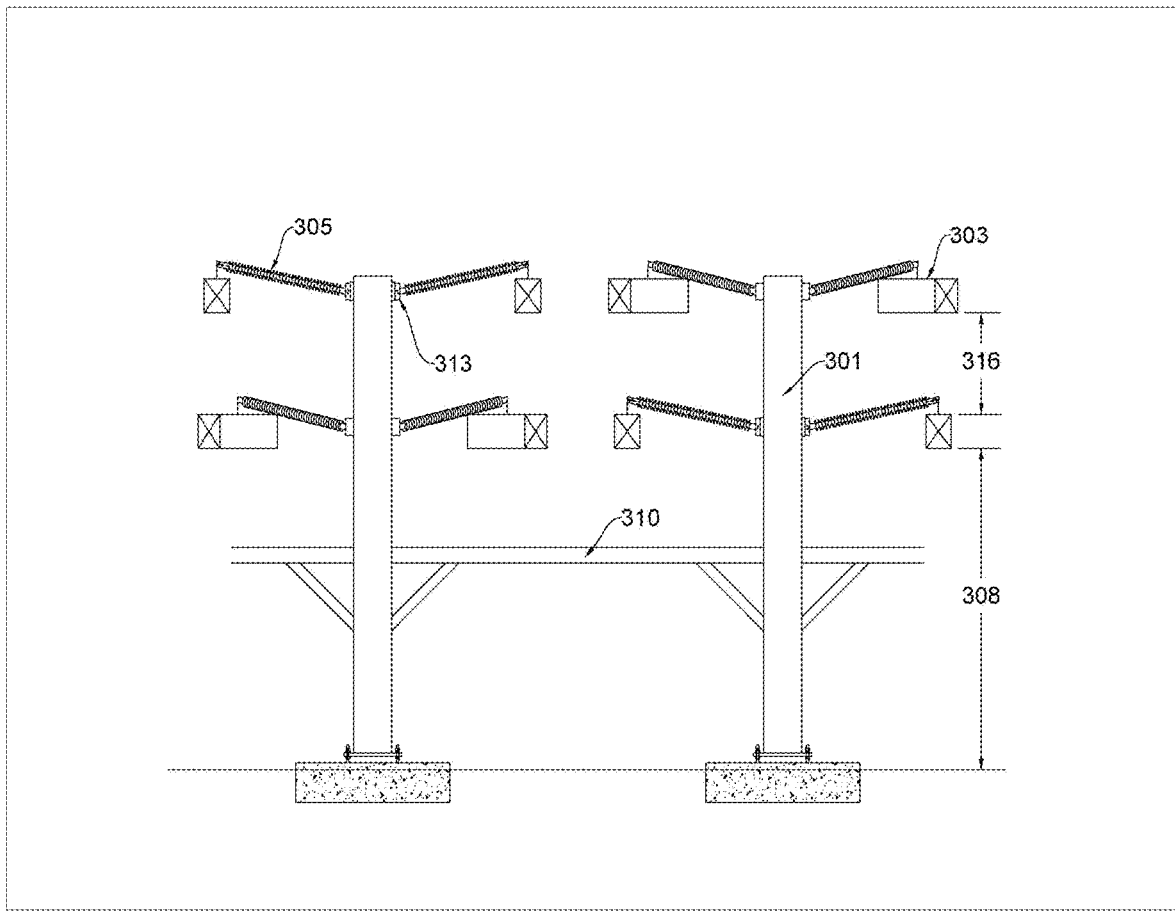
FIG. 10d shows exemplary Vertical Safety Clearance Zones for stacked horizontally mounted transformers.

FIG. 10*d* shows exemplary vertical safety clearance zones for stacked horizontally mounted transformers. In this embodiment the electrical devices 303 are still arranged symmetrical about device mounting column 301 but also stacked vertically to increase the number of transformers mounted in a given footprint. In addition to required minimum vertical safety clearance 308 there is a device vertical spacing clearance requirement 316. Note that the possibility of stacking of electrical devices is not limited to this embodiment.

If onsite assembly is to be by way of bolted together assemblies, then the component parts will typically have predrilled, bolt together flanges welded onto the respective component parts as necessary for simple, bolt together assembly at the installation site. With or without flanges, parts to be bolted together would be predrilled, again for simple, bolt together assembly at the installation site. If a welded assembly is to be used at the substation site, then again any welding flanges needed would be pre-mounted (typically welded) onto any component parts as required. In either case, these approaches minimize the expensive on-site labor and other costs. Also, by simply providing the component parts in a limited range of sizes, each selected for assembling substations using equipment of corresponding capacities, and merely replicating structures during onsite assembly as required for the required substation, a highly modular, low cost, and particularly if realized by a bolted together assembly, is readily expandable by merely replicating assembled structures, or can be disassembled for moving, etc. as desired. In addition, the components may be proportioned to meet electrical component spacing requirements and sufficiently elevate the electrical components to allow servicing and/or replacement from below without disturbing other components just for access purposes.

Figure 11:
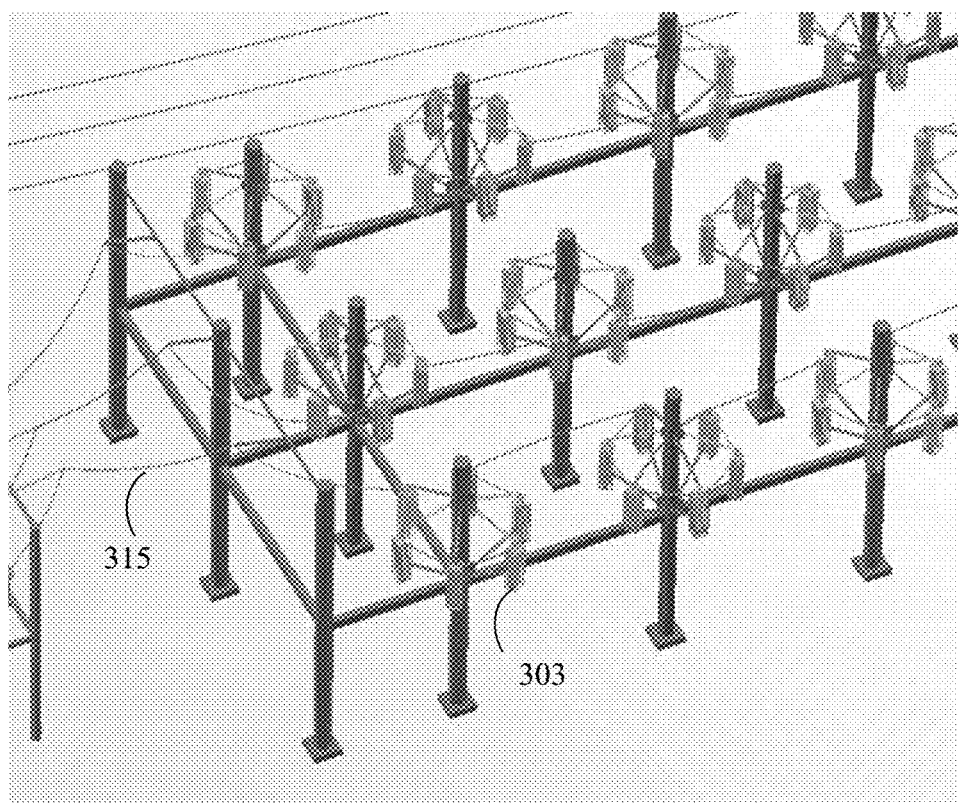
FIG. 11 shows an exemplary, modular, space-efficient electrical substation.
Figure 12:
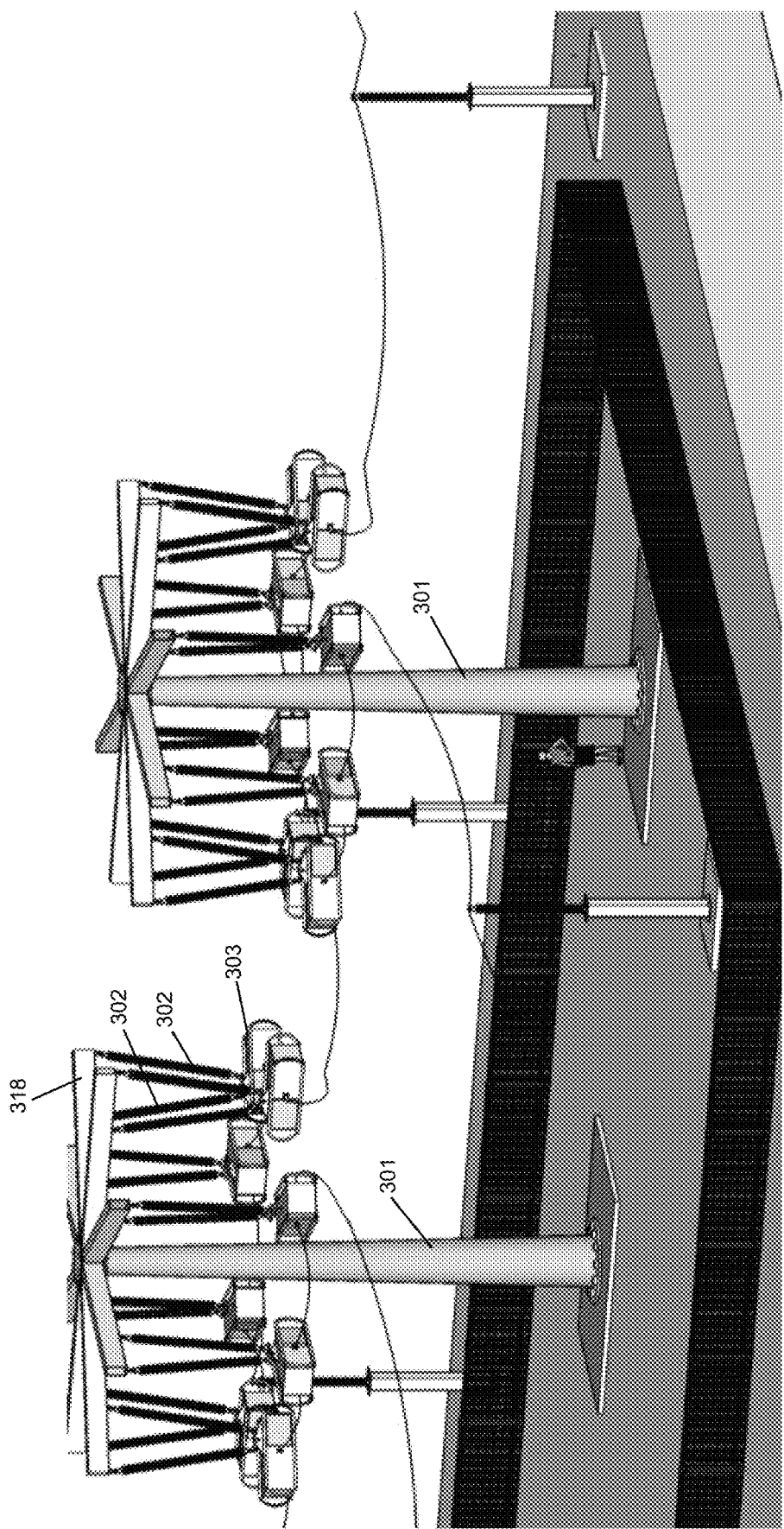
FIG. 12 illustrates an alternate embodiment of the invention.

FIG. 11 shows an exemplary, modular, space-efficient electrical substation. Electrical conductors 315 connect the power grid to multiple electrical devices 303. FIG. 12 illustrates an alternate device mounting column 301 extending vertically and anchored at a lower end to a foundation, and alternate electrical device mounting structure, electrical device and insulator support. In particular, the device mounting column is a tapered, tubular structure with eight equally spaced, outward extending arms supporting electrical devices 303, each on a pair of insulators 302, the electrical devices having their electrical connections on the sides thereof instead of the top thereof. Like the embodiments of FIGS. 10*a* and 10*b*, and embodiments like FIG. 12 can be positioned with minimum spacing by rotating the outward extending arms supporting electrical devices on one mounting column 22.5 degrees with respect to the outward extending arms supporting electrical devices on the adjacent mounting column.

Thus the present invention has a number of aspects, which aspects may be practiced alone or in various combinations or sub-combinations, as desired. Also while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. A structure supporting electrical devices at an electrical substation of a power grid, comprising:
    a device mounting column extending vertically and anchored at a lower end to a foundation or anchor;
    a first set of N electrical devices connected to a phase of the power grid;
    a first set of at least N electrical insulators, at least one of the first set of at least N electrical insulators being coupled to a respective one of the first set of N electrical devices and the device mounting column, and supporting and providing electrical insulation for the respective one of the first set of N electrical devices;
    the N electrical devices as supported by the first set of at least N electrical insulators being equally radially distributed around a vertical axis of the device mounting column;
    a second set of N electrical devices connected to the phase of the power grid; and
    a second set of at least N electrical insulators, at least one of the second set of at least N electrical insulators being coupled to a respective one of the second set of N electrical devices and the device mounting column, and supporting and providing electrical insulation for the respective one of the second set of N electrical devices above the first set of N electrical devices;
    the second set of N electrical devices as supported by the second set of at least N electrical insulators also being equally radially distributed around the vertical axis of the device mounting column;
    wherein N is greater than three.

2. The structure of claim 1 wherein the first and second sets of electrical devices are transformers respectively mounted horizontally.

3. The structure of claim 1 wherein at least one of the first set of at least N electrical insulators extends laterally from the device mounting column to a respective one of the N electrical devices.

4. The structure of claim 1 further comprising a first electrical device mounting structure on the device mounting column, the first electrical device mounting structure having a first plurality N of arms extending outward in a plurality of directions therefrom and equally spaced around the vertical axis of the device mounting column;
    at least one of the first set of at least N electrical insulators coupled to vertically support and provide electrical insulation for a respective one of the first set of N electrical devices is coupled to the device mounting column through a respective outward extending arm.

5. The structure of claim 4 wherein at least one of the first set of at least N electrical insulators extend downward from the electrical device mounting structure on the respective one of the outward extending arms.

6. The structure of claim 5 further comprising at least N additional insulators, each of the additional insulators extending between the device mounting column and a respective one of the N electrical devices.

7. The structure of claim 4 wherein the electrical device mounting structure is a first beam and tie assembly.

8. The structure of claim 1 wherein the electrical devices are high-voltage current and/or voltage affecting electrical devices.

9. The structure of claim 1 wherein the device mounting column has a device mounting column anchor flange on the lower end thereof for bolting to an anchor at a site of the electrical substation.

10. The structure of claim 1 wherein the device mounting column is anchored at the lower end to the foundation by being embedded in concrete.

11. The structure of claim 1 wherein the device mounting column is anchored at a lower end to a foundation by a steel pile.

12. The structure of claim 1 further comprising:
    additional device mounting columns extending vertically and anchored at a respective lower end thereof.

13. The structure of claim 12 further comprising horizontal beams interconnecting the device mounting columns.

14. The structure of claim 13 wherein the interconnections between the horizontal beams and the device mounting columns are bolted interconnections.

15. The structure of claim 13 wherein the interconnections between the horizontal beams and the device mounting columns are welded interconnections, wherein the welded interconnections can be broken for reuse of the horizontal beams and the device mounting columns.

16. The structure of claim 13 further comprising reinforcement struts angularly disposed and extending between the horizontal beams and the device mounting columns to provide additional structural support.

17. The structure of claim 12 wherein the device mounting columns number three or integral multiples of three.

18. The structure of claim 17 wherein the power grid is a multi-phase electrical power distribution system and wherein the electrical devices are electrically connected in series or in parallel in each phase, and wherein the electrical connections are at the top or sides of the electrical devices.

19. The structure of claim 18 wherein electrical connections between electrical devices comprise single, double or multiple conductors.

20. The structure of claim 1 wherein electrical connections to the electrical devices are at the top or sides of the electrical devices.

21. A system, comprising:
    a first of the structure of claim 1 and a second of the structure of claim 1, the first and second of the structure of claim 1 being positioned side by side, the electrical devices supported on the device mounting column of the second of the structure of claim 1 being rotated about the vertical axis of the device mounting column of the second of the structure of claim 1 relative to the electrical devices supported on the device mounting column of the first of the structure of claim 1, whereby minimum electrical device horizontal spacing clearance is achieved with a minimum device mounting column spacing.

22. The system of claim 21 wherein the first set of N electrical devices of the first of the structure of claim 1 and the first set of N electrical devices of the second of the structure of claim 1 are connected to different phases of the power grid.

* * * * *